United States Patent [19]
Jyrkkä

[11] Patent Number: 5,936,979
[45] Date of Patent: Aug. 10, 1999

[54] METHOD FOR FRAME QUALITY DETECTION AND A RECEIVER

[75] Inventor: Kari Jyrkkä, Oulu, Finland

[73] Assignee: Nokia Telecommunications Oy, Espoo, Finland

[21] Appl. No.: 08/930,187

[22] PCT Filed: Jan. 23, 1997

[86] PCT No.: PCT/FI97/00032

§ 371 Date: Sep. 24, 1997

§ 102(e) Date: Sep. 24, 1997

[87] PCT Pub. No.: WO97/27686

PCT Pub. Date: Jul. 31, 1997

[30] Foreign Application Priority Data

Jan. 24, 1996 [FI] Finland .................................. 960326

[51] Int. Cl.$^6$ .................................................. G11C 29/00
[52] U.S. Cl. ..................... 371/40.11; 371/45; 370/330; 455/226.1; 455/226.3
[58] Field of Search ..................... 371/40.11, 45; 370/330; 455/67.3, 67.1, 226.1, 226.3

[56] References Cited

U.S. PATENT DOCUMENTS

| | | | |
|---|---|---|---|
| 5,157,672 | 10/1992 | Kondou et al. | 371/43.7 |
| 5,175,867 | 12/1992 | Wejke et al. | 455/33.1 |
| 5,321,705 | 6/1994 | Gould et al. | 371/43.7 |
| 5,754,537 | 5/1998 | Jamal | 370/330 |
| 5,797,095 | 8/1998 | Gustafson et al. | 455/422 |

FOREIGN PATENT DOCUMENTS

| | | |
|---|---|---|
| 489993 A1 | 6/1992 | European Pat. Off. . |
| 681406 A5 | 3/1993 | Switzerland . |
| 94/17472 | 8/1994 | WIPO . |
| 95/08152 | 3/1995 | WIPO . |
| 95/16315 | 6/1995 | WIPO . |
| 95/30282 | 11/1995 | WIPO . |

*Primary Examiner*—William Grant
*Assistant Examiner*—McDieunel Marc
*Attorney, Agent, or Firm*—IP Group of Pillsbury Madison & Sutro LLP

[57] ABSTRACT

A method for frame quality detection and a receiver for implementing the method. For frame quality detection, results A and B are compared with each other and with a predetermined threshold. The result A is formed as a sum/product of soft bit decisions or as a bit error rate from bursts comprising bits from successive frames N and N+1. The result B is formed in the same way from frames N−1 and N. When comparing the result A and the result B with each other, the frame N is determined to be bad if one of the result A and the result B is essentially smaller than another of the result A and the result B. The frame N is also determined to be bad if the both result A and the result B are smaller than the predetermined threshold value. The method improves detection of a bad frame and accordingly reduces interference sound received by a receiver and caused by erroneously interpreted bad frames, especially during periods of silence.

17 Claims, 2 Drawing Sheets

METHOD FOR FRAME QUALITY DETECTION AND A RECEIVER

This application is the national phase of international application PCT/FI97/00032 filed Jan. 23, 1997 which designated the U.S.

BACKGROUND OF THE INVENTION

1. Field of the Invention

The invention relates to method for frame quality detection used in a radio system comprising a plurality of base stations and subscriber terminals transmitting and receiving signals via different channels, the quality of the signals being measured by the bit error rate, the terminals generating speech frames from voice and silence descriptor frames regularly from silence, the frames comprising bits, and each frame being interleaved with another frame, and each frame being transmitted in a known number of essentially successive bursts comprising a frame start and end identifier and bits that are decoded by soft bit decisions.

The invention also relates to a receiver arranged to be used in a radio system comprising a plurality of base stations and subscriber terminals arranged to transmit and receive signals via different channels, and arranged to measure the quality of the signals by the bit error rate, and comprising at least speech frames and silence descriptor frames, the frames comprising bits and each frame being interleaved with another frame and each frame being arranged to be transmitted in a known number of essentially successive bursts comprising a frame start and stop identifier and bits that are arranged to be decoded by soft bit decisions.

2. Description of Related Art

In a cellular radio system, and especially in the GSM system, discontinuous transmission (DTX) is used to reduce interference and subscriber terminal power consumption. This operates so that when the voice coder of the subscriber terminal observes silence in speech, the subscriber terminal transmits only periodically (once every 480 ms) a silence descriptor frame (SID), typically used for noise generation in a receiving subscriber terminal. Without noise the receiving user finds the silence unpleasant and may even think that the connection has been disconnected.

However, the silence descriptor frame causes problems. In a cellular radio system the channel decoder of a receiver attempts to correct mistakes caused mainly by the air interface between subscribers. However, correction does not always succeed. This means that the channel decoder detects a bad frame (BFI), and the substitution and muting algorithm in the speech decoder "plays" again the last good frame received. If several bad frames succeed each other, the speech decoder "plays" the last good frame received again and again and gradually attenuates it completely. Known bad frame detection methods include e.g. 3 bit CRC (Cyclic Redundancy Check) and the pseudober method. In the CRC method a check parity is calculated for a bit block according to a known code polynome. A bit block usually comprises the most significant bits of a speech block, giving a three-bit parity check. This is compared with the parity bits calculated by the channel coder, and if the parity bits are the same, the frame received is good. In the pseudober method, a received frame is channel coded again with a convolution code after Viterbi decoding. The coded frame is directly compared with a frame received from the channel, and the differences in the bit sequences of the frames indicate error corrections made by the Viterbi decoder. All errors cannot, however, be corrected by the Viterbi decoder. In this method a frame corresponding to e.g. a speech block is determined to be bad if the Viterbi decoder has changed more bits than allowed by a predetermined limit. Another known method of estimating the bit error rate is to calculate the bit error rate from a predetermined training sequence of each traffic channel during a measuring period. If the received signal comprises more erroneous bits than allowed by the predetermined limit, the frame is determined to be bad.

Reception of discontinuous transmission is the most susceptible to errors in detection of bad frames. If a speech decoder determines a bad frame to be good during silence, the speech decoder switches to speech mode and "plays" this false frame. As the frame was erroneously detected, the following frames are likely to be real false frames and the speech decoder starts frame substitution and muting processes with a false frame, generating very unpleasant sounds in the ear of the receiving user.

CHARACTERISTICS OF THE INVENTION

It is an object of the present invention to essentially improve bad frame detection as compared with prior art. Simultaneously, the user friendliness of a subscriber terminal is also improved.

This is achieved with a method described in the preamble, which is characterized in that two results, result A and result B, are compared with each other and with a predetermined threshold value for frame quality detection, result A being formed as the sum of soft bit decisions on one or more bursts comprising bits from successive frames N and N+1, and result B being formed as the sum of soft bit decisions on one or more bursts comprising bits from successive frames N−1 and N, and that when comparing results A and B with each other, frame N is determined to be bad if either result is essentially smaller than the other result, or when comparing results A and B with the predetermined threshold value, frame N is determined to be bad if both results are smaller than the predetermined threshold value.

Another method of the invention is characterized in that two results, result A and result B, are compared with each other and a predetermined threshold value for frame quality detection, result A being formed as the product of soft bit decisions on one or more bursts comprising bits from successive frames N and N+1, and result B being formed as the product of soft bit decisions on one or more bursts comprising bits from successive frames N−1 and N, and that when comparing results A and B with each other, frame N is determined to be bad if either result is essentially smaller than the other, or when comparing results A and B with the predetermined threshold value, frame N is determined to be bad if both results are smaller than the predetermined threshold value.

A third method of the invention is characterized in that two results, result A and result B, are compared with each other and a predetermined threshold value for frame quality detection, result A being formed by calculating the bit error rate from one or more bursts comprising bits from successive frames N and N+1, and result B being formed by calculating the bit error rate from one or more bursts comprising bits from successive frames N−1 and N, and that when comparing results A and B with each other, frame N is determined to be bad if either result is essentially smaller than the other, or when comparing results A and B with the predetermined threshold value, frame N is determined to be bad if both results are greater than the predetermined threshold value.

The invention further relates to a receiver comprising a result unit for creating two results, result A and result B, of which the result unit is arranged to form result A as the sum of soft bit solutions from one or more bursts comprising bits from successive frames N and N+1, and result B as the sum of soft bit decisions on one or more bursts comprising bits from successive frames N−1 and N, and a comparison unit for comparing the two results with each other and with a predetermined threshold value, the comparison unit being arranged to determine frame N to be bad when comparing the results with each other if either result of the comparison unit is essentially smaller than the other result, or when comparing the results with the predetermined threshold value, the comparison unit is arranged to determine frame N to be bad if both results are smaller than the predetermined threshold value.

The invention also relates to a receiver comprising a result unit for creating two results, result A and result B, of which the result unit is arranged to form result A as the product of soft bit solutions from one or more bursts comprising bits from successive frames N and N+1, and result B as the product of soft bit decisions on one or more bursts comprising bits from successive frames N−1 and N, and a comparison unit for comparing the two results with each other and with a predetermined threshold value, the comparison unit being arranged to determine frame N to be bad when comparing the results with each other if either result of the comparison unit is essentially smaller than the other result, or when comparing the results with the predetermined threshold value, the comparison unit is arranged to determine frame N to be bad if both results are smaller than the predetermined threshold value.

The invention also relates to a receiver comprising a result unit for creating two results, result A and result B, of which the result unit is arranged to form result A as the bit error rate of one or more bursts, wherein the bursts comprise bits from successive frames N and N+1, and result B as the bit error rate of one or more bursts, wherein the bursts comprise bits from successive frames N−1 and N, and a comparison unit for comparing the two results with each other and with a predetermined threshold value, the comparison unit being arranged to determine frame N to be bad when comparing the results with each other if either result of the comparison unit is essentially smaller than the other result, or when comparing the results with the predetermined threshold value, the comparison unit is arranged to determine frame N to be bad if both results are greater than the predetermined threshold value.

The method and receiver of the invention provide considerable advantages. The method of the invention essentially reduces erroneous bad frame detection in discontinuous transmission especially when erroneous detection causes a receiver unpleasant sounds. In the method of the invention a relative threshold is used, the receiver automatically being adjusted to varying circumstances in the channel.

The preferable embodiments of the methods of the invention are also disclosed in the attached dependent claims and the preferable embodiments of the receivers of the invention are disclosed in the attached dependent claims related to the receivers.

BRIEF DESCRIPTION OF THE DRAWINGS

In the following the invention will be described in greater detail with reference to examples in accordance with the accompanying drawings in which.

DESCRIPTION OF THE PREFERRED EMBODIMENTS

The GSM system, for example, is a typical radio system to which the invention can be applied. A subscriber terminal in such a system converts user speech or other voice into digital form and forms speech blocks, or speech frames, from speech in a speech coder, the frames consisting of bits and comprising a given time interval of voice, e.g. 20 ms. A typical speech coder is based on a RELP coder (Residually Linear Predictive Coder). A speech coder detects speech and silence. When the user is not speaking or the speech coder generally does not observe voice, the transmitter forms SID frames regularly, e.g. once every 480 ms. Both SID and speech frames are transmitted in a known number of bursts.

Figure 1:
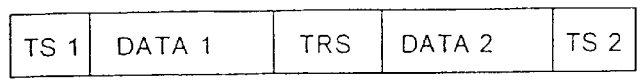
FIG. 1 shows a normal burst in the GSM system.

Let us first examine, as an example, a normal burst in the GSM system, shown in FIG. 1. It usually comprises 148 bits. The bits of the burst are in sequences comprising 3 start bits TS1, 58 data bits in a data sequence DATA1, 26 training bits in a training sequence TRS, 58 data bits DATA2 and 3 stop bits TS2. Data sequences DATA1 and DATA2 comprise subscriber communicated information, e.g. speech. The training sequence TRS is a predetermined sequence by means of which e.g. channel properties and signal quality can be determined.

In the GSM system, essentially eight successive bursts are employed for transmission of a speech and a SID frame. Absolute sequence is prevented especially by the SACCH channel (Slow Associated Control Channel) in which a base station transmits control information to subscriber terminals. Bits of two successive frames are interleaved into one burst and e.g. in the GSM system this is accomplished by placing bits of a first speech or SID frame in even positions in the data sequence of the burst and by placing bits of another speech or SID frame in uneven positions. A receiver detects the start and the end of the frames and the bursts are decoded in the channel decoder into bits by a soft bit decision for which a Viterbi decoder is normally used.

Figure 2:
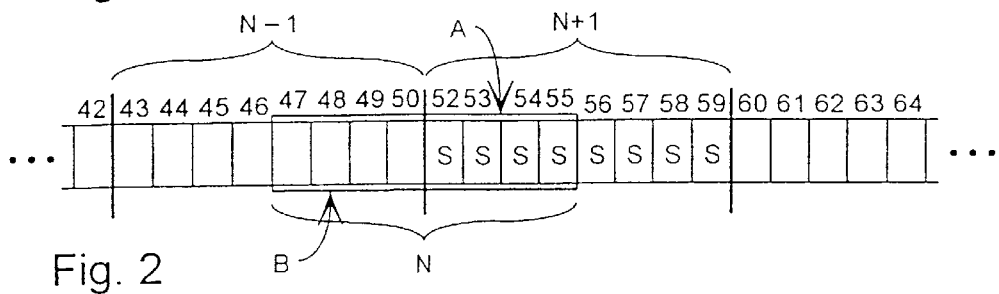
FIG. 2 shows frame quality detection before a SID frame.
Figure 3:
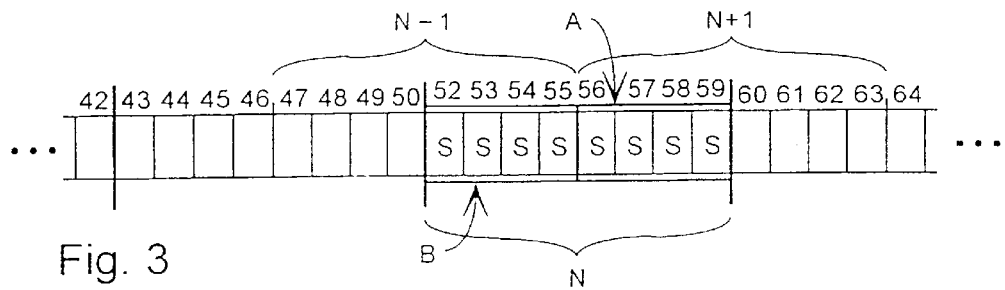
FIG. 3 shows frame quality detection from a SID frame.
Figure 4:
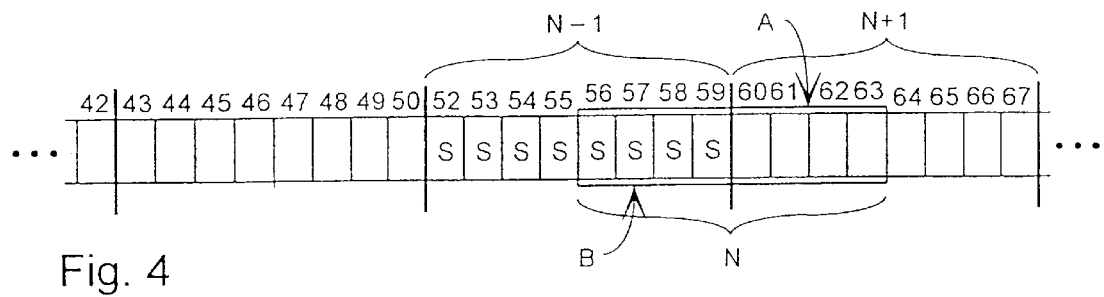
FIG. 4 shows frame quality detection after a SID frame.

FIGS. 2 to 5 show a series of instances where frame detection is effected about a SID frame during silence. Referring first to FIGS. 2 to 4, SID bursts are denoted by the letter S. The numerals 42 to 50 and 52 to 64 (to 67) in the upper portion of FIGS. 2 to 4 are burst numbers in TDMA frames (Time Division Multiple Access). In these examples the bursts preceding burst 42 and succeeding burst 62 are irrelevant. Since silence is long, the transmitter transmits a SID frame update in bursts 52 to 59. Since frame 51 is reserved for transmission of control information on the SACCH channel, it is unusable as to the invention, and has been omitted from FIGS. 2 to 4.

Figure 5:
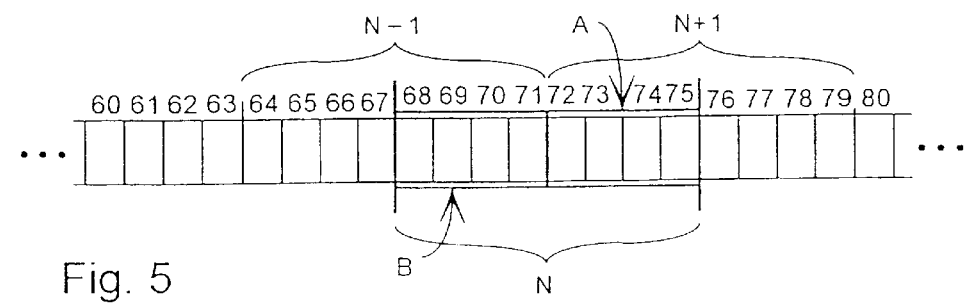
FIG. 5 shows frame quality detection from noise.

Referring to FIG. 5, it shows the situation after transmission of a SID frame when the transmitter does not transmit bursts in the time intervals reserved for it because of silence. However, in this case, too, the numerals 60 to 80 refer to TDMA frame burst numbers, the bursts not having been transmitted because of silence. Bursts preceding burst 60 and succeeding burst 80 are irrelevant in this case. In prior art solutions erroneous bad frame detection occurs most likely when receiving frames that are on both sides of the SID frame update transmission 52 to 59. The method of the invention utilizes soft bit solutions or alternatively the bit error rate.

SOFT BIT SOLUTION

In the method of the invention, two results to be compared, result A and result B, are formed of soft bit solutions after channel decoding. Generally both results A and B are formed by an additive or a cumulative, arithmetic operation, such as addition and multiplication, on which other similar operations are based. In practice the results are preferably formed by adding or summing soft bit solutions from one or more bursts with bits from successive frames. Thus, result A is formed of bursts, the order number of whose frames can be denoted by N and N+1. Result B is formed of bursts belonging to previous frames N−1 and N. Even if the transmitter had not transmitted such bursts, as is the case during silence, the receiver cannot know this, but also forms soft bit decisions on interference signals, noise etc. it has received. Bit decisions are uncertain when not made on an actual signal, the solutions made from which being significantly more certain. This is utilized in the method of the invention.

In the GSM system, since one frame, i.e. a speech or SID block, is typically transmitted interleaved in eight bursts, result A is preferably formed of four essentially successive bursts. Here it is preferable to utilize all four bursts, whereby the result is integrated with the bit decisions on all bursts, and random variations decrease, but it is also possible to use only one, two or three bursts out of all four. Result A, comprising bits from frames N and N+1, is compared with result B, which is a result A immediately preceding the current result A and comprises bits from frame N−1 and N. Consequently result B does not have to be separately calculated. If the difference between results A and B is significantly great, frame N is determined to be bad, since in this case bursts producing a smaller result have most likely not been transmitted. Similarly, if both results A and B are smaller than a predetermined threshold value, frame N is determined to be bad. This predetermined threshold value depends on the quality of the connection, and is specific to the case and the situation. Frame N is preferably determined to be good if both results A and B are greater than some other predetermined threshold value, other results leading to frame N being determined to be bad. This predetermined threshold value also depends on the quality of the connection, and is specific to the case and the situation. In the method of the invention all bits of each burst or only e.g. bits of the data sequence or the training sequence can be utilized. When only result A has been formed at the start of a bad frame detection method, result B is preferably given some predetermined value, e.g. zero. This results in the logically preferable result that what was never listened to (nothing was received before the start) will in principle be interpreted as a bad frame. In another embodiment of the invention a product is formed of soft bit decisions, the method of the invention operating otherwise in the same way as with summation of bit decisions when positive numerical values of bit decisions are used.

The method of the invention can be illustrated by FIGS. 2 to 5. Starting with FIG. 2, let frame N−1 be formed of bursts 43 to 50, frame N of bursts 47 to 50 and 52 to 55, and frame N+1 of bursts 52 to 59. Accordingly, result B is formed of soft bit decisions on bursts 47 to 50. Since interval 42 to 50 is silence, the transmitter has transmitted nothing and hence the receiver has essentially received mere noise. The channel decoder of the receiver has attempted to make bit decisions on this noise, but naturally the decisions are uncertain in all four bursts 47 to 50, of which result B is formed. Since the bit decisions are uncertain, their result as a sum and a product is small. The transmitter transmits the SID frame essentially in the following bursts 52 to 55. Bits of a previous, i.e. in this case a non-transmitted, frame have been interleaved with SID bits into the bursts. The GSM specifications do not define what the bits of a non-transmitted frame should be, with which a SID burst is interleaved. They may be, e.g., bits of a SID frame. This is irrelevant to the invention since the most important difference is that the transmitter is switched on and transmits a SID frame. Since the transmitter is transmitting, the receiver makes definite decisions and result A becomes great both as a sum and a product at point 55 where result A is formed of soft bit decisions on bursts 52 to 55. When comparing result B, formed of bursts 47 to 50, with result A, formed of bursts 52 to 55, it can be seen that result A is essentially greater than result B. The conclusion is that a frame N, being decoded and included in bursts 47 to 50 and 52 to 55, has not been transmitted. The following frame, N+1, part of which has been transmitted in bursts 52 to 55, has apparently been transmitted on the basis of this measurement. The essential difference between results A and B is determined case-specifically. The threshold of an essential difference may be, e.g., that either result is four times greater than the other result.

The method of the invention operates in the following way in the case of a good frame, shown in FIG. 3. Let frame N−1 comprise bursts 47 to 50 and 52 to 55, frame N bursts 52 to 59, and frame N+1 bursts 56 to 63. Let us assume that we are at point 59. In this case result A has been formed of soft decisions on bursts 56 to 59, preferably as a sum or a product, and it is great since SID frame N has been transmitted. Result B is also great as it, too, has been formed of bursts 52 to 55 of the transmitted SID frame N as a sum or a product of soft bit decisions. Instead of a SID frame, a speech frame might also be involved, as during speech frames the transmitter is naturally transmitting, and thus soft bit decisions are certain. Since there is no essential difference between results A and B, and the results are great, the transmitted frame N is not determined to be bad, instead it is good.

By means of FIG. 4 one can observe the operation of the method of the invention at the end of a SID frame or a speech frame. Let frame N−1 comprise bursts 52 to 59, frame N bursts 56 to 63, and frame N+1 bursts 60 to 67. In this case result A is formed of soft bit decisions on bursts 60 to 63 at point 63. These bursts have not been transmitted as they appear during silence and thus result A is assigned a low value both as a sum and as a product. Result B is formed as the sum or the product of soft bit decisions of bursts 56 to 59 and result B is assigned a high value as the bursts 56 to 59 are of SID frames. In this way results A and B essentially deviate from each other and frame N is determined to be bad.

FIG. 5 illustrates another preferable property of the invention. Let frame N−1 comprise bursts 64 to 67, frame N bursts 68 to 75 and frame N+1 bursts 72 to 79. Let us assume that we are at point 75, where result A has been formed of soft bit decisions of bursts 72 to 75. This result is compared with result B, formed of soft bit decisions of bursts 68 to 71. Since owing to silence these bursts were never transmitted, and consequently they are mainly background noise, the bit decisions of the receiver have been uncertain in both cases and hence both results are small both as a sum and as a product. When both results A and B are smaller than a predetermined threshold value, a bad frame has been transmitted, even if the values of results A and B are not very different. Accordingly, the frame comprised by bursts 68 to 75 is determined to be bad. The predetermined threshold value depends also, in this case, on the quality of the connection and is thus case-specific.

In a method of the invention, when result A is being formed, it can preferably be weighted with a desired coefficient. It must, however, be noted that when multiplying using a negative number, the signs of the values of the results become opposite and the comparison has to be made as though using absolute values.

BIT ERROR RATE

FIGS. 2 to 5 also illustrate the frame quality detection method of the invention, based on the bit error rate. The approach is largely similar to that in the method based on soft bit decisions except that when the certainty of soft bit decisions increases, the bit error rate decreases. In the case of FIG. 2, the bit error rate of result A is small, as the SID frame has been transmitted and accordingly the signal is strong. The bit error rate of result B is great as the bursts used in forming result B have not been transmitted and the receiver has mainly received noise. Thus the difference between results A and B is great and frame N is determined to be bad.

In FIG. 3 both results A and B are small since they have been formed of bursts in association with a SID frame. Thus frame N is preferably determined to be a good frame.

In the case of FIG. 4, result A is formed of noise since the bursts expected by the receiver have not been transmitted because of silence. Accordingly, result A becomes great. Result B is formed of bursts associated with a SID frame and thus result B is assigned a small value. Since the difference between results A and B is great, frame N is determined to be bad.

In the case of FIG. 5, both results A and B are formed of noise since bursts are not transmitted because of silence. Thus both results A and B are assigned a high value and frame N is preferably determined to be bad.

RECEIVER

Figure 6:
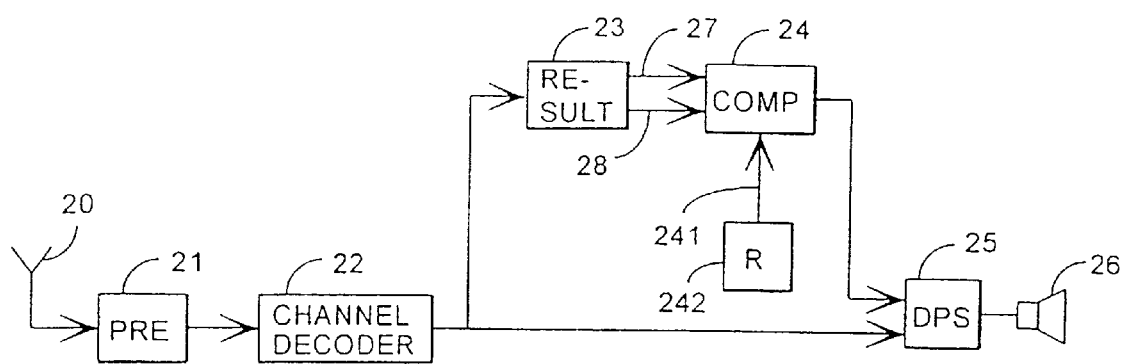
FIG. 6 shows a receiver conforming with the invention.

FIG. 6 shows a receiver conforming with the invention. The receiver, being typically a subscriber terminal in a radio system, comprises an antenna 20, preprocessing unit 21, a channel decoder 22, a result unit 23, a comparison unit 24, signal processing unit 25 and a speaker 26. The preprocessing unit 21 comprise, e.g., RF unit (Radio Frequency) for demodulation of a signal received from the antenna 20, a filter for filtering the demodulated signal, and an A/D converter for converting the signal into digital form. The channel decoder 22 typically decodes a convolution coded signal and its operation is based on e.g. the Viterbi algorithm. The channel decoder 22 usually also decodes the scrambling and interleaving of the preprocessed signal. Signal processing unit 25 usually decodes a RELP coded signal received from the channel decoder 22 and eventually D/A convert the signal into a form suitable for the speaker 26. The invention includes the result unit 23 and the comparison unit 24, and a memory 242 into which a predetermined threshold value 241 has been stored. The result unit 23 forms a result by a method of the invention and the comparison unit 24 compares results A and B and the predetermined threshold value 241 by the methods of the invention. The comparison unit 24 detects the quality of a received frame and transfers information thereon to the signal processing unit 25. If the received frame is good, the signal processing unit 25 controls the speaker 26 so that the information comprised by the signal can be heard by the receiver. That is, if a speech frame is concerned, the voice of the transmitter can be heard from the speaker 26, but if the frame is a silence descriptor frame, the signal processing unit typically generates a type of noise in the speaker 26 that the listener finds more pleasant than silence. If the frame is bad, the signal processing unit 25 takes known measures by e.g. repeating the previous good frame. It is, however, essential that the receiver detects good and bad frames more reliably than prior art and also on both sides of silence descriptor frames, and hence does not create an unpleasant interference sound in the receiver ear.

The result unit 23 and the comparison unit 24 of the invention have been implemented electronically with, e.g., a microprocessor technique with which calculation and comparison of the results are preferably effected. Reference numerals 20 to 22 and 25 refer to conventional antenna, analog, digital and microprocessor techniques used in radio systems.

Even though the invention has been explained in the above with reference to examples in accordance with the accompanying drawings, it is obvious that the invention is not restricted to them but can be modified in various ways within the scope of the inventive idea disclosed in the above and in the attached claims.

I claim:

1. A method for frame quality detection used in a radio system comprising a plurality of base stations and subscriber terminals transmitting and receiving signals via different channels, a quality of the signals being measured by a bit error rate, the subscriber terminals generating speech frames from voice frames and silence descriptor frames, generated regularly during periods of silence, the frames comprising bits, each of the frames being interleaved with another one of the frames, and each of the frames being transmitted in a known number of essentially successive bursts comprising a frame start, an end identifier and bits that are decoded by soft bit decisions, the method comprising:

forming a result A as a first sum of soft bit decisions on one or more bursts comprising bits from successive frames N and N+1;

forming a result B as a second sum of soft bit decisions on one or more bursts comprising bits from successive frames N−1 and N; and comparing the result A and the result B with each other and with a predetermined threshold value for frame quality detection, and that when comparing the result A and the result B with each other, determining the frame N to be bad if one of the result A and the result B is essentially smaller than another one of the result A and the result B, or when comparing the result A and the result B with the predetermined threshold value, determining the frame N to be bad if both the result A and the result B are smaller than the predetermined threshold value.

2. A method for frame quality detection used in a radio system comprising a plurality of base stations and subscriber terminals transmitting and receiving signals via different channels, a quality of the signals being measured by a bit error rate, the subscriber terminals generating speech frames from voice frames and silence descriptor frames, generated regularly during periods of silence, the frames comprising bits, each of the frames being interleaved with another one of the frames, and each of the frames being transmitted in a known number of essentially successive bursts comprising a frame start, an end identifier and bits that are decoded by soft bit decisions, the method comprising:

forming a result A as a first product of soft bit decisions on one or more bursts comprising bits from successive frames N and N+1;

forming a result B as a second product of soft bit decisions on one or more bursts comprising bits from successive frames N−1 and N; and comparing the result A and the result B with each other and with a predetermined threshold value for frame quality detection, and that when comparing the result A and the result B with each other, determining the frame N to be bad if one of the result A and the result B is essentially smaller than another one of the result A and the result B, or when comparing the result A and the result B with the predetermined threshold value, determining the frame N to be bad if both the result A and the result B are smaller than the predetermined threshold value.

3. A method as claimed in claim 1 or 2, wherein the frame N is determined to be good if both the result A and the result B are greater than the predetermined threshold value.

4. A method for frame quality detection used in a radio system comprising a plurality of base stations and subscriber terminals transmitting and receiving signals via different channels, a quality of the signals being measured by a bit error rate, the subscriber terminals generating speech frames from voice frames and silence descriptor frames, generated regularly during periods of silence, the frames comprising bits, each of the frames being interleaved with another one of the frames, and each of the frames being transmitted in a known number of essentially successive bursts comprising a frame start, an end identifier and bits that are decoded by soft bit decisions, the method comprising:

forming a result A by calculating a first bit error rate from one or more bursts comprising bits from successive frames N and N+1;

forming a result B by calculating a second bit error rate from successive frames N−1 and N; and comparing the result A and the result B with each other and with a predetermined threshold value for frame quality detection, and that when comparing the result A and the result B with each other, determining the frame N to be bad if one of the result A and the result B is essentially smaller than another one of the result A and the result B, or when comparing the result A and the result B with the predetermined threshold value, determining the frame N to be bad if both the result A and the result B are greater than the predetermined threshold value.

5. A method as claimed in claim 1, 2 or 4, wherein each of the frames is transmitted in eight essentially successive bursts, and when the result A and the result B are being formed, four essentially successive bursts are used.

6. A method as claimed in claim 4, wherein the frame N is determined to be good if both the result A and the result B are smaller than the predetermined threshold value.

7. A method as claimed in claim 1, 2 or 4, wherein the result A and the result B are weighted with a coefficient.

8. A method as claimed in claim 1, 2 or 4, wherein the result A and the result B are formed of essentially successive bursts so that when forming the result A and the result B, only channels intended for transmission of the speech frames and the silence descriptor frames are used.

9. A method as claimed in claim 1, 2 or 4, wherein the result B has a predetermined value if only the result A has been formed.

10. A receiver arranged to be used in a radio system comprising a plurality of base stations and subscriber terminals arranged to transmit and receive signals via different channels, and arranged to measure a quality of the signals by a bit error rate, the signals comprising at least speech frames and silence descriptor frames, the frames comprising bits and each of the frames being interleaved with another frame and each of the frames being arranged to be transmitted in a known number of essentially successive bursts comprising a frame start and stop identifier and bits that are arranged to be decoded by soft bit decisions, the receiver comprising:

means for creating two results, a result A and a result B, the means for creating two results being arranged to form the result A as a first sum of soft bit decisions from one or more bursts comprising bits from successive ones of the frames N and N+1, and the result B as a second sum of soft bit decisions on one or more bursts comprising bits from successive ones of the frames N−1 and N; and means for comparing the result A and the result B with each other and with a predetermined threshold value, the comparing means being arranged to determine the frame N to be bad when comparing the result A and the result B with each other if one of the result A and the result B is essentially smaller than an other one of the result A and the result B, or when comparing the the result A and the result B with the predetermined threshold value, the comparing means is arranged to determine the frame N to be bad if both the result A and the result B are smaller than the predetermined threshold value.

11. A receiver arranged to be used in a radio system comprising a plurality of base stations and subscriber terminals arranged to transmit and receive signals via different channels, and arranged to measure a quality of the signals by a bit error rate, the signals comprising at least speech frames and silence descriptor frames, the frames comprising bits and each of the frames being interleaved with another frame and each of the frames being arranged to be transmitted in a known number of essentially successive bursts comprising a frame start and stop identifier and bits that are arranged to be decoded by soft bit decisions, the receiver comprising:

means for creating two results, a result A and a result B, the means for creating two results being arranged to form the result A as a first product of soft bit decisions from one or more bursts comprising bits from successive ones of the frames N and N+1, and the result B as a second product of soft bit decisions on one or more bursts comprising bits from successive ones of the frames N−1 and N; and means for comparing the result A and the result B with each other and with a predetermined threshold value, the comparing means being arranged to determine the frame N to be bad when comparing the result A and the result B with each other if one of the result A and the result B is essentially smaller than an other one of the result A and the result B, or when comparing the the result A and the result B with the predetermined threshold value, the comparing means is arranged to determine the frame N to be bad if both the result A and the result B are smaller than the predetermined threshold value.

12. A receiver as claimed in claim 10 or 11, wherein while one frame is arranged to be transmitted in eight essentially successive bursts and while the result A and the result B of the means for creating two results are formed of four essentially successive bursts of the transmitted frame, the comparing means is arranged to determine the frame N to be good if both the result A and the result B are greater than the predetermined threshold value.

13. A receiver arranged to be used in a radio system comprising a plurality of base stations and subscriber terminals arranged to transmit and receive signals via different channels, and arranged to measure a quality of the signals by a bit error rate, the signals comprising at least speech frames and silence descriptor frames, the frames comprising bits and each of the frames being interleaved with another frame and each of the frames being arranged to be transmitted in a known number of essentially successive bursts comprising a frame start and stop identifier and bits that are arranged to be decoded by soft bit decisions, the receiver comprising:

means for creating two results, a result A and a result B, the means for creating two results being arranged to form the result A as a first bit error rate of one or more bursts, wherein the bursts comprise bits from successive ones of the frames N and N+1, and the result B as a second bit error rate of one or more bursts, wherein the bursts comprise bits from successive ones of the frames N−1 and N; and means for comparing the result A and the result B with each other and with a predetermined threshold value, the comparing means being arranged to determine the frame N to be bad when comparing the result A and the result B with each other if one of the result A and the result B is essentially smaller than an other one of the result A and the result B, or when comparing the the result A and the result B with the predetermined threshold value, the comparing means is arranged to determine the frame N to be bad if both the result A and the result B are greater than the predetermined threshold value.

14. A receiver as claimed in claim 10, 11 or 13, wherein while one frame is arranged to be transmitted in eight essentially successive bursts, the means for creating two results is arranged to form the result A and the result B of the soft bit decisions of four essentially successive bursts.

15. A receiver as claimed in claim 13, wherein while one frame is arranged to be transmitted in eight essentially successive bursts and while the result A and the result B of the means for creating two results are formed of four essentially successive bursts, the comparing means is arranged to determine the frame N to be good if both the result A and the result B are smaller than the predetermined threshold value.

16. A receiver as claimed in claim 10, 11 or 13, wherein the means for creating two results is arranged to weight the result A and the result B with a coefficient.

17. A receiver as claimed in claim 10, 11 or 13, wherein the means for creating two results is arranged to form the result A and the result B of essentially successive bursts so that when forming the result A and the result B, the means for creating two results is arranged to use only channels intended for transmission of the speech frames and the silence descriptor frames.

\* \* \* \* \*